United States Patent Office 3,051,763
Patented Aug. 28, 1962

3,051,763
PREPARATION OF CHLORINATED NAPHTHALENES
John W. Wagner, Westminster, Calif., assignor to Richfield Oil Corporation, Los Angeles, Calif., a corporation of Delaware
No Drawing. Filed July 22, 1960, Ser. No. 44,581
5 Claims. (Cl. 260—650)

This invention relates to a process for halogenation of naphthalene and more particularly relates to a novel process for the manufacture of halogenated naphthalenes by a one-step substitution process using a ring halogenation catalyst.

Naphthalenes are produced primarily from coal tar and cracked petroleum stocks. The higher boiling naphthalene fractions derived from cracked petroleum stocks contain a mixture of naphthalene and its homologues, e.g., methylnaphthenes and dimethylnaphthenes. Such naphthalenes tend to form viscous tars upon halogenation by conventional processes. By one prior art process naphthalene chloride $C_{10}H_8Cl_4$ is formed in an addition reaction by direct treatment with chlorine gas. The naphthalene chloride is then heated with potassium hydroxide to form chloronaphthalene by dehydrogenchlorination. In a second prior art process chloronaphthalenes are formed by substitution in one step using chlorine gas and a ring chlorination catalyst, such as anhydrous aluminum chloride. It was found, however, that this latter catalytic chlorination process formed a heavy tar when a commercial mixture of petroleum naphthalenes containing substantial amounts of alkylnaphthalenes, was treated.

Accordingly, it is an object of the present invention to provide a process for halogenating naphthalene mixtures without the formation of viscous tars.

It is a further object of the present invention to provide a process for chlorinating petroleum naphthalene mixtures in a one step operation without the formation of viscous tars above the dichloro point. Other objects and a more complete understanding of my invention will be apparent from the following description and examples taken in conjunction with the appended claims.

Briefly described, my invention relates to a process for chlorinating a petroleum naphthalene mixture by introducing chlorine gas into the mixture initially and subsequently adding a ring chlorination catalyst to the reaction mixture. After the addition of the catalyst, the addition of chlorine is continued until the desired chlorination level is reached.

I have found that by delaying the addition of the ring chlorination catalyst until after the naphthalenes have been initially treated with chlorine gas, a tar free chlorinated naphthalene product may be produced. My new process was performed in a suitable reaction vessel at room temperature and atmospheric pressure by bubbling chlorine gas into the liquid naphthalene mixture in the absence of a chlorination catalyst unitl a substantial quantity of chlorine was abosrbed by the reaction mixture. At this point, a suitable ring chlorination catalyst is added and the naphthalene mixture is further treated with chlorine until the desired degree of chlorination is reached. Tar formation probably occurs initially between the mono and dichloro points, consequently the catalyst should advantageously be added prior to this period. The catalyst addition should be delayed until at least 2%, preferably 5% chlorine has been added to the naphthalene reaction mixture, or until at least one-tenth, preferably one-fourth of the mono-chloro point has been reached. The mono-chloro point is reached when an average of one chlorine atom per naphthalene molecule has been added to the naphthalene mixture undergoing chlorination. The mono-chloro point obviously varies with different naphthalenes, for example, the mono-chloro point of chloronaphthalene is reached at 20.6% chlorine, that of chloromethylnaphthalene at 18.7% chlorine, and chlorodimethylnaphthalene at 17.4% chlorine. The dichloro point is reached when an average of two chlorine atoms per naphthalene molecule have been added to the naphthalene mixture.

Petroleum naphthalenes are produced as by-products in the production of gasoline by catalytic cracking and reforming. Cracked petroleum stocks boiling in the range of 390–450° F. contain about 5–10% naphthalene. Thermal catalytic cracking bottoms are a high aromatic gas oil, boiling in the range 400–600° F. Approximately 50% of this material is aromatic and approximately 95% of these aromatics are polycyclic aromatics, mostly naphthalenes. The higher boiling fractions contain naphthalene homologs which are more abundant than naphthalene itself. In such higher boiling fractions, an approximate ratio of naphthalene:methylnaphthalenes: dimethylnaphthalenes is 1:7:10. Consequently a petroleum naphthalene fraction boiling in the range of 400–600° F. would contain a preponderance of alkyl-substituted naphthalenes. Such naphthalene mixtures form heavy tars when chlorinated by the conventional catalytic-substitution process.

The catalyst contemplated in my invention is a ring chlorination catalyst which theoretically promotes union of the chlorine atoms with carbon atoms in the ring rather than substituted carbon atoms. I prefer to use a Lewis type acid catalyst, that is, an electron acceptor or substance which can accept a lone pair of electrons from a base to complete the octet of one of its atoms. These substances are generally non-aqueous acids and have no hydrogen available for ionization. Aluminum chloride, ferric chloride, iodine, or stannic chloride are such acids.

Chlorinated naphthalenes are useful as weed oil, wood treating oil, insecticides, and fungicides. Although the unchlorinated naphthalenes are useful as weed oils and wood treating oil, chlorination of these naphthalenes enhances their usefulness by increasing their toxicity and fungicity.

The following examples illustrate my invention.

*Example I*

A 501 gram sample of a T–2 bubble tar dimethylnaphthalene cut boiling in the range of 510–523° F. was chlorinated in a reactor flask using 11 grams of granular aluminum chloride. The dimethylnapththalene cut was obtained by fractionating a thermal catalytic cracking T–2 bubble tower bottom mixture. The viscosity of the reaction mixture increased rapidly at about the monochloro point and at the dichloro point the stirrer came to a halt due to the formation of tar. The weight difference between the naphthalene mixture before and after chlorine treatment indicated that 135 grams of chlorine or theoretically 21.3% was reacted with the naphthalene mixture. A chemical analysis of the product showed that it contained 20% chlorine.

Chlorine consumption was as follows:

| Time | Grams of Cl₂ Consumed | Temperature °C. |
|---|---|---|
| 0 minutes | 0 | 5 |
| 10 minutes | 11 | 20 |
| 25 minutes | 39 | 20 |
| 90 minutes | 154 | 25 |
| 160 minutes | 277 | 25 |
| (Tar formation so thick that the stirrer motor would not turn stirrer; reaction was stopped) | | |

Example II

A second chlorination of the dimethylnaphthalene material of Example I was made under conditions similar to those used in Example I. A 311 gram sample of the dimethylnaphthalenes cut was treated approximately 1½ hours before a ring chlorination catalyst was added. Ten grams of anhydrous aluminum chloride were added at this point and the reaction continued for an additional 2 hours before the reaction was stopped. The resulting chlorinated product was a fluid brownish liquid containing no tar. The weight difference between the naphthalenes before and after reacting indicated that 190 grams or theoretically 37.8% of chlorine were added to the naphthalenes. Chemical analysis of the chlorinated naphthalenes revealed a chlorine content of 36.2%.

Chlorine consumption was as follows:

| Time | Grams of Cl₂ Consumed | Temperature °C. |
|---|---|---|
| 0 minutes | 0 | 10 |
| 7 minutes | 20 | 35 |
| 20 minutes | 41 | 27 |
| 45 minutes | 89 | 24 |
| 90 minutes | 159 | 15 |
| 105 minutes | (reaction stopped and 10 grams anhydrous AlCl₃ added—then reaction started again by bubbling Cl₂ through mixture) | |
| 110 minutes | 161 | 8 |
| 120 minutes | 177 | 15 |
| 150 minutes | 207 | 18 |
| 180 minutes | 241 | 14 |
| 210 minutes | 286 | 15 |
| 230 minutes | 297 | 14 |

Example III

The procedure of Example II was followed on a 323 gram sample of the same material as used in Example II and a tar-free product was again obtained. 188 grams of chlorine, theoretically 36.8%, were added to the naphthalene mixture. Chemical analysis of the chlorinated product indicated a content of 35.2% chlorine. The chlorinated product was washed with sodium hydroxide to determine the stability of the chlorinated naphthalene formed. After washing with sodium hydroxide no chlorine evolution was evident.

Chlorine consumption was as follows:

| Time | Grams of Cl₂ Consumed | Temperature °C. |
|---|---|---|
| 0 minutes | 0 | 5 |
| 40 minutes | 50 | 17 |
| 120 minutes | 155 | 17 |
| (reaction stopped and 10 grams granular AlCl₃ added to reaction mixture; reaction was then commenced by bubbling Cl₂ into the reaction mixture) | | |
| 190 minutes | 250 | 9 |
| 235 minutes | 300 | 10 |

The foregoing examples illustrate the fact that naphthalenes with a substantial alkylnaphthalene content can be chlorinated to a tar-free product by delaying the addition of the ring chlorination catalyst until after a portion of the naphthalenes have been reacted with chlorine. Although my invention has been described with a certain degree of particularity, it should not be limited to the details set forth, but should be given the full scope of the appended claims.

I claim:

1. In a process for producing chlorinated naphthalenes by treating a petroleum naphthalene mixture in the liquid phase with chlorine in the presence of a Lewis-type acid catalyst, said naphthalene mixture boiling in the range of 400 to 600° F., the improvement comprising: delaying the addition of said catalyst until chlorine equivalent to approximately one-fourth mole of chlorine per mole of naphthalenes has been reacted therewith.

2. A process for producing chlorinated naphthalenes comprising the steps of treating a naphthalene mixture boiling in the range of 400 to 600° F. and comprising naphthalene and alkyl naphthalenes in the liquid phase with chlorine until chlorine equivalent to approximately one-fourth mole of chlorine per mole of naphthalenes has been reacted therewith, adding a ring chlorination catalyst to said mixture and treating said catalyst containing mixture with chlorine.

3. A process of claim 2 wherein said ring chlorination catalyst is a Lewis type acid.

4. A process of claim 2 wherein said naphthalene mixture is a refined polycyclic aromatic petroleum catalytic cracking effluent.

5. In a process for producing chlorinated naphthalenes by treating a liquid petroleum naphthalene mixture boiling in the range of 400 to 600° F. and with chlorine, the improvement comprising delaying the addition of a ring chlorination catalyst until after the mono-chloro point is reached.

References Cited in the file of this patent

UNITED STATES PATENTS 2,261,758    Gustafsson    Nov. 4, 1941

FOREIGN PATENTS 357,743    Great Britain    Oct. 1, 1931